United States Patent [19]
Ball

[11] Patent Number: 4,854,073
[45] Date of Patent: Aug. 8, 1989

[54] MOUSE EXTERMINATING DEVICE AND METHOD

[76] Inventor: Ralph A. Ball, 2821 Stratford Dr., Greensboro, N.C. 27408

[21] Appl. No.: 232,220

[22] Filed: Aug. 15, 1988

[51] Int. Cl.$^4$ .............................................. A01M 23/38
[52] U.S. Cl. .......................................... 43/75; 43/78; 43/85
[58] Field of Search .................... 43/73, 75, 77, 78, 85

[56] References Cited
U.S. PATENT DOCUMENTS

| | | | |
|---|---|---|---|
| 1,464,697 | 8/1923 | Connolly | 43/75 |
| 2,599,541 | 6/1952 | Burns | 43/75 |
| 3,638,348 | 2/1972 | Lusk | 43/78 |
| 4,550,524 | 11/1985 | Goebel | 43/78 |
| 4,641,456 | 2/1987 | Boharski | 43/73 |

*Primary Examiner*—Nicholas P. Godici
*Assistant Examiner*—William Scott Ardes

[57] ABSTRACT

A mouse exterminating device and method is presented with improved safety features. Activated electrical circuitry causes the mouse to be suffocated by impingement of a horizontal blade while a thermal switch prevents the device from overheating thus reducing the chance of fire. Indicator lights demonstrate whether the device is turned on and also if the device has been activated by a mouse.

11 Claims, 2 Drawing Sheets

MOUSE EXTERMINATING DEVICE AND METHOD

BACKGROUND OF THE INVENTION

1. Field Of The Invention

The present invention relates to pest exterminating devices and particularly to electrically operated devices to kill rodents.

2. Description of The Prior Art And Objectives Of The Invention

Pest exterminating devices have been invented in the past including mouse and rat traps which operate by spring action. The spring trips a bait bar upon contact by, for example a mouse which will release a spring activated lever with enough force to kill the mouse. Devices of this nature are oftentimes avoided by mice which are too small to be caught by the trap and even if the trap is successful, the owner must remove the dead mouse, rebait and reset the trap for the next victim. Also vibration or other mechanical forces can cause a conventional trap to misfire, thereby providing a free meal for any rodent that may later wander by.

With the problems associated with conventional mouse traps, the present invention was conceived and one of its objectives is to provide a trap that will quickly and efficiently slay a mouse that contacts the bait switch layer.

It is another objective of the present invention to provide a mouse exterminating device and method which operates by electrical means with certain safety features included.

It is also an objective of the present invention to provide a mouse exterminating device and method which utilizes a thermal switch connected to a solenoid which will activate to slay a mouse while the thermal switch prevents the solenoid from overheating.

Another objective of the present invention is to provide a mouse exterminating device having a housing with an opening therein with electrical circuitry contained within the housing, so a mouse entering the opening will be promptly exterminated and the device will automatically reset for another mouse.

It is yet still another objective of the present invention to provide a method of slaying a mouse which includes the step of activating a bait switch that causes a horizontal blade to activate thus contacting the mouse and suffocating the same.

Other objectives and advantages of the invention will be realized by those that are skilled in the art as a more detailed description of the invention as presented below.

SUMMARY OF THE INVENTION

The present invention relates to a mouse exterminating device and method which includes a housing having an opening therein whereby a mouse can enter and approach a visible bait package which is attached to a bait switch lever. Once the lever is contacted a switch is closed which activates a thermal switch and a solenoid which is connected to a horizontal blade. The action of the solenoid causes the blade to begin a movement towards the mouse at which time a second switch is activated which will maintain constant electrical current through the thermal switch and solenoid to cause the horizontal blade to move an effective amount pinning the mouse to the housing and therefore suffocating the mouse. After a short period of time the solenoid generates sufficient heat monitored by the adjustable thermal switch and the solenoid is then deactivated by the thermal switch thereby allowing the horizontal blade to return by use of spring members attached thereto. As the horizontal blade releases its grip on the mouse the mouse will fall from the opening in the housing and the device is then reset so the exterminating cycle can begin once more.

DESCRIPTION OF THE PREFERRED EMBODIMENT

Figure 2:
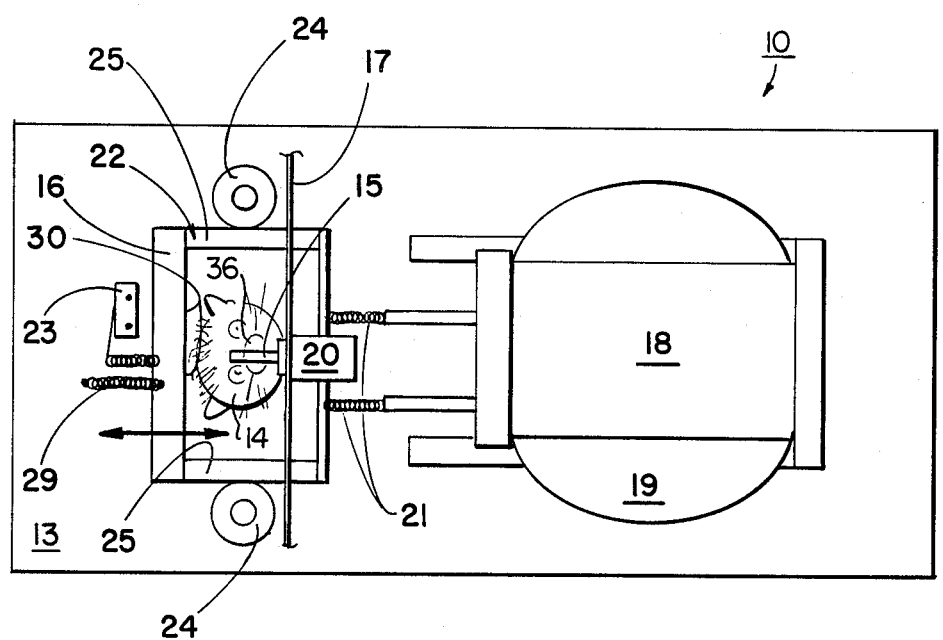
FIG. 2 shows a top illustration of certain of the mechanical components.

The preferred apparatus of the invention is shown in FIG. 2 whereby a horizontal blade is joined to an electrical solenoid. A thermal switch keeps the solenoid from overheating as the horizontal blade is pulled to contact the mouse to suffocate the same. A bait switch lever activates the device and a second electrical switch maintains current to the solenoid and the thermal switch deactivates the solenoid whereby springs return the horizontal blade to its original position so the cycle can begin anew. The preferred method of the invention comprises contacting a bait switch lever to allow current to flow from a thermal switch to a solenoid activating a second electrical switch to thereby cause the solenoid to direct the horizontal blade to the mouse, suffocating the same. The mouse impinged with the horizontal blade for a period of time causes suffocation. The thermal switch which senses the heat output of the solenoid deactivates the solenoid after a time thereby returning the horizontal blade to its original position beyond the housing opening.

DETAILED DESCRIPTION OF THE DRAWINGS AND OPERATION OF THE INVENTION

Figure 1:
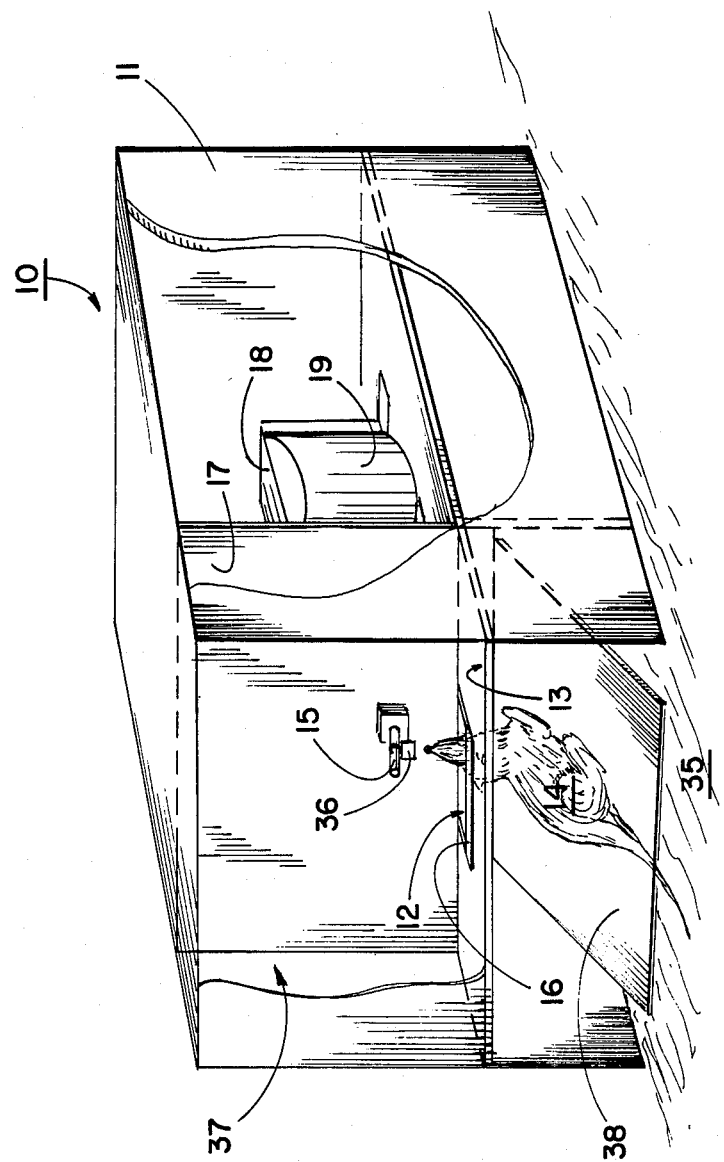
FIG. 1 illustrates the housing of the mouse exterminating device of the present invention having an opening therein for a mouse to enter.

Turning now to the drawings, as shown in FIG. 1, mouse exterminating device 10 is depicted with a metal housing 11 and a small opening 12 in horizontal front shelf 13 thereof. Opening 12 may for example be 1 and ½ inches by 1 and ½ inches and may be placed approximately 6 inches from floor 35. Mouse 14 is shown in opening 12 to procure bait 36 attached to bait switch lever 15 as shown in FIG. 1. As would be understood from FIG. 1, mouse 14 does not totally enter upper compartment 37 but merely inserts its head, neck, shoulders and perhaps front feet in effort to eat bait 36 attached to bait switch lever 15. When horizontal blade 16 also seen in FIG. 2 closes, mouse 14 is suffocated since its head and neck are held against back wall 17 for a sufficient period of time. Upon release of blade 16 mouse 14 will fall from opening 12 to ramp 38 immediately below whereby another mouse can then enter opening 12 and be exterminated in the same manner.

Housing 11 is formed from a metal such as 10 gauge galvanized steel or aluminum for safety purposes so the device will not burn and also to prevent a mouse from gnawing through a side or back wall in housing 11 in an effort to enter the housing to obtain the bait contained therein.

Figure 3:
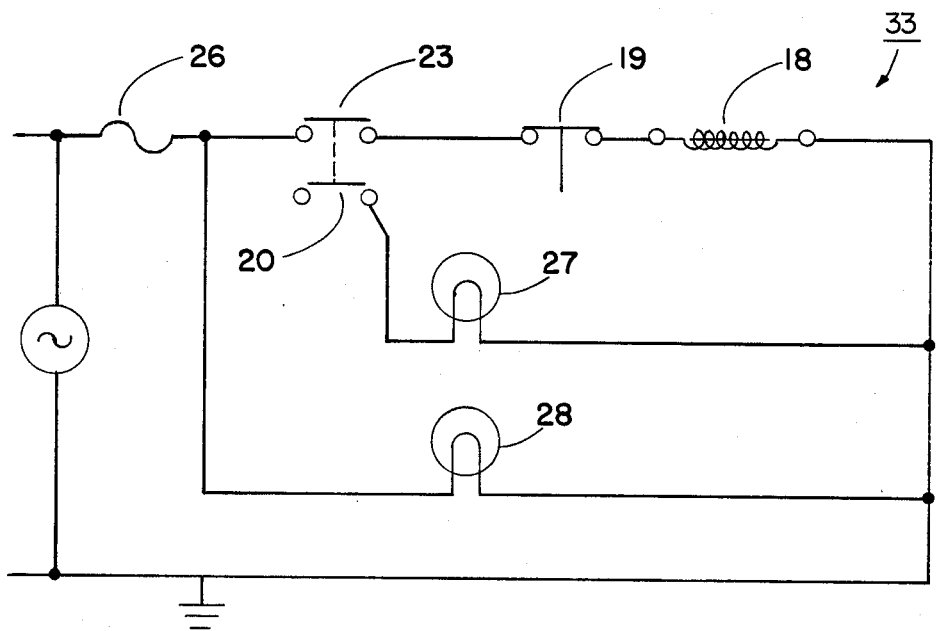
FIG. 3 demonstrates a schematic view of the electrical circuitry of the invention.

The operation of exterminating device 10 can be explained by reviewing FIGS. 2 and 3 as follows. Device 10 contains a solenoid 18 which is electrically connected to thermal switch 19. A mouse contacting bait switch lever 15 which will have bait 36 affixed thereto will activate electrical circuitry 33 which includes switch 20 which allows electrical current to flow through thermal switch 19 and to solenoid 18 thereby causing solenoid 18 to apply pressure to resilient members 21 which are low pressure coil springs to move horizontal bar frame 22 toward wall 17 thereby bringing blade 16 into contact with mouse 14. As horizontal bar 16 begins its movement, electrical switch 23 is activated which insures a constant flow of current to thermal switch 19 and solenoid 18 as bait switch 20 only intially activates solenoid 18 but does not provide a constant flow of current to solenoid 18.

Rollers 24 insure a smooth, straight movement of horizontal bar frame 22 as rollers 24 contact side frame members 25. Thermal switch 19 is a heat sensitive switch of conventional design which will monitor the heat generated by solenoid 18. Thermal switch 19 may be set for example at 110 degrees Fahrenheit whereby, once the temperature of solenoid 18 reaches 110 degrees, the current to solenoid 18 is then turned off providing a safety feature to the invention against overheating and possible fire damage. Another safety feature of the invention is shown in FIG. 3 by fuse 26 which also prevents the circuitry from overheating. Lights 27 and 28 are also of value in that light 27 if on allows an observer to determine if horizontal blade 16 is in the activated mode and light 28 (if on) tells the operator the device is turned on and ready to exterminate.

The method of device 10 can be explained as follows: Mouse 14 travels up ramp 38 of housing 11 and enters opening 12 in an effort to obtain food 36 which is attached to bait switch lever 15. As bait switch lever 15 is nudged or pulled, lever 15 activates bait switch 20 which in turn closes, allowing current to flow through thermal switch 19 to solenoid 18. Solenoid 18 then, through resilient members 21 pulls horizontal blade 16 in a horizontal direction whereby switch 23 is activated which insures a continuous flow of electricity to thermal switch 19 and solenoid 18. Horizontal blade 16 which is formed from a rigid substance such as a 1/16" thick aluminum bar continues its path until it contacts mouse 14 and with a small amount of pressure applied such as ½ pound holds mouse 14 against wall 17 as shown in FIG. 1 thereby suffocating mouse 14 causing it to expire. As solenoid 18 is activated, it generates a certain amount of heat which is sensed by thermal switch 19 and when solenoid 18 reaches a preset temperature such as 110 degrees Fahrenheit, thermal switch 19 shuts off the flow of electricity to solenoid 18 whereupon horizontal blade 16 is then returned to its original position by return spring 29. As horizontal blade 16 withdraws from the then dead mouse 14, mouse 14 falls from opening 12 to the ground or floor 35 below by the effect of gravity and as would be understood mouse 14 would roll down ramp 38 to the ground or floor 35 below.

As would be further understood, horizontal blade 16 has a substantially rounded contacting edge 30 and does no sever or slice mouse 14 but is merely used to grip the same during suffocation. Switch 19 may be set to temperatures other than 110 degrees Fahrenheit may be adjusted to other temperature ranges depending on the particular solenoid and the heat generated therefrom and as only a few minutes are required to suffocate the mouse an additional safety feature is provided with resilient members 21 which are relatively weak coil springs. Thus, should a child place his hand within housing 10 and contact bait switch lever 15, the action of horizontal blade 16 would only provide a pinching action and would not lacerate or sever the child's fingers.

The illustrations and examples provided herein are for explanatory purposes and are not intended to limit the scope of the appended claims.

I claim:

1. A mouse exterminating device comprising: a housing, electrical circuitry, said circuitry positioned within said housing, a bait switch, said switch joined to said circuitry, a thermal switch, said thermal switch joined to said circuitry a blade, said blade mounted on said housing and connected to said bait switch whereby contact with said bait switch by a mouse will activate said blade causing the same to thereby dispatch the mouse and said thermal switch will prevent overheating.

2. A mouse exterminating device as claimed in claim 1 and including a solenoid, said solenoid joined to said electrical circuitry and to said blade, said solenoid to activate said blade.

3. A mouse exterminating device as claimed in claim 2 and including a thermal switch, said thermal switch connected to said solenoid.

4. A mouse exterminating device as claimed in claim 1 and including a resilient member, said resilient member connected to said blade to withdraw said blade upon deactivation of said solenoid.

5. A mouse exterminating device as claimed in claim 1 and including a holding switch, said holding switch joined to said blade and to said electrical circuitry.

6. A mouse exterminating device comprising: a housing, a shelf, said shelf joined to said housing, said shelf defining an opening to allow a mouse to enter electrical circuitry, said circuitry positioned within said housing, a horizontal blade, said blade movable from an open to a closed position along said shelf, a holding switch, a thermal switch, a bait switch, said holding, thermal and bait switches connected to said electrical circuitry, a solenoid, said solenoid joined to said horizontal blade and to said thermal switch whereby a mouse upon entering said opening contacts said bait switch.

7. A mouse exterminating device as claimed in claim 6 and including a resilient member, said resilient member to return said horizontal bar to its open position upon deactivation of said solenoid.

8. A mouse exterminating device as claimed in claim 6 wherein said thermal switch will deactivate said solenoid when the temperature of said solenoid reaches 110 degrees Fahrenheit.

9. A method of slaying a mouse with a solenoid activated blade comprising the step of:
    (a) activating a bait switch,
    (b) allowing current to flow from a thermal switch to the solenoid,
    (c) activating the blade by said solenoid,
    (d) activating a holding switch by the movement of said blade; and
    (e) slaying a mouse by the movement of said blade to contact the mouse to suffocate the same.

10. The method of claim 9 and including the step of releasing said blade.

11. The method of claim 10 comprising allowing the solenoid to heat to 110 degrees Fahrenheit and thereafter releasing said blade.

* * * * *